United States Patent [19]
Daniels

[11] Patent Number: 5,248,113
[45] Date of Patent: Sep. 28, 1993

[54] TENSION RESPONSIVE FISHING APPARATUS

[76] Inventor: John J. Daniels, 350 Bristol St. Unit A-1, Waterbury, Conn. 06708

[21] Appl. No.: 993,610

[22] Filed: Dec. 21, 1992

Related U.S. Application Data

[62] Division of Ser. No. 772,930, Oct. 8, 1991, Pat. No. 5,195,267.

[51] Int. Cl.$^5$ ............................................. A01K 89/00
[52] U.S. Cl. .................... 242/246; 242/244; 242/288; 242/285; 188/267; 188/158; 43/18.1; 43/25
[58] Field of Search ............... 242/243, 244, 245, 246, 242/285, 288; 188/267, 155, 158, 162; 43/20, 25, 19, 19.2

[56] References Cited

U.S. PATENT DOCUMENTS

| | | | |
|---|---|---|---|
| 3,419,992 | 1/1969 | Strahm | 43/20 |
| 3,516,191 | 6/1970 | Baenziger | 43/25 |
| 3,745,684 | 7/1973 | Larson | 43/25 |
| 4,544,111 | 10/1985 | Nakajima | 188/267 |
| 4,601,439 | 7/1986 | Moosberg | 242/288 |
| 4,697,758 | 10/1987 | Hirose et al. | 43/20 |
| 4,940,194 | 7/1990 | Young | 188/267 |
| 5,090,531 | 2/1992 | Carlson | 188/267 |
| 5,170,866 | 12/1992 | Ghaem | 188/267 |

Primary Examiner—Mark Rosenbaum
Assistant Examiner—Chuck Y. Mah
Attorney, Agent, or Firm—John J. Daniels

[57] ABSTRACT

A tension responsive fishing apparatus is provided which includes a pole member having an interior. The interior of the pole member is filled with a variable viscosity fluid, such as, electrical rheological fluid, magnetic-powder dispersed fluid, or the like. A controlled potential may be applied to the variable viscosity fluid which causes the variable viscosity fluid to vary in viscosity dependent on the amount of potential applied thereacross. In other words, depending on the amount of potential applied to the variable viscosity fluid disposed in the interior of the pole member, the flexure of the pole member may be selectively varied from extremes of high flexibility to high rigidity. An improved reel member is provided which varies a resistance applied to a bobbin member which is effected to control the release of fishing line. The varying resistance is controlled in response to input signals inputted dependent on tension sensed in the fishing line and/or a value selected by a user. The varying resistance means may be comprised of a friction plate disposed between two electrodes and surrounded by a variable viscosity fluid. The resistance varied in response to a controlled potential applied through the electrodes. In accordance with the present invention, a tension responsive fishing apparatus is provided for automatically setting a hook when a fish strikes. Tension is sensed in the fishing line during a fish strike and triggers a hook setting operation. The fishing line is conveyed in a direction effective to set the hook.

2 Claims, 13 Drawing Sheets

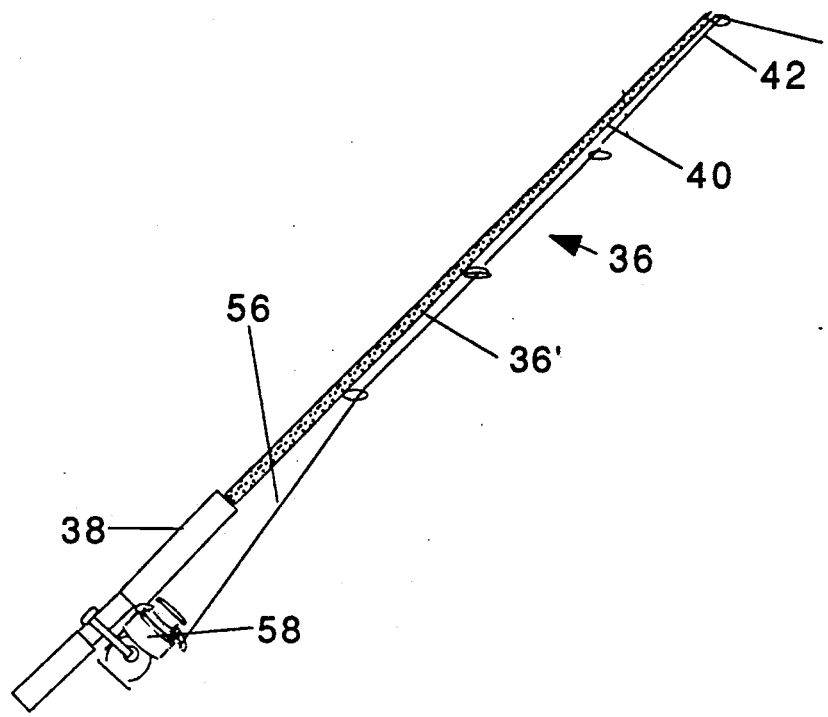
Figure (1a)
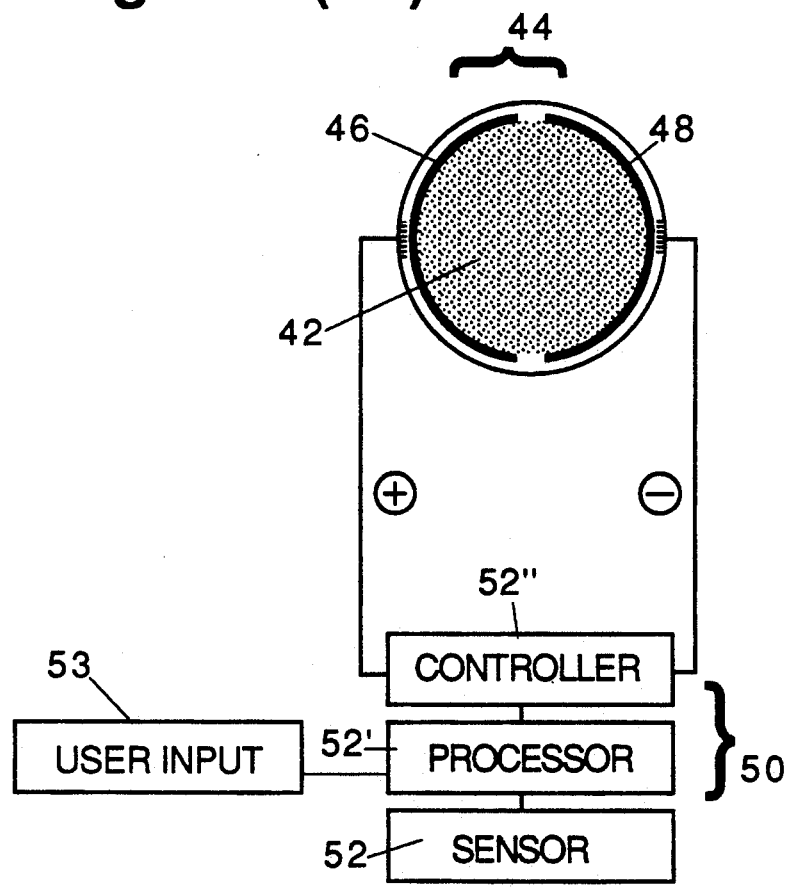
Figure (1b)

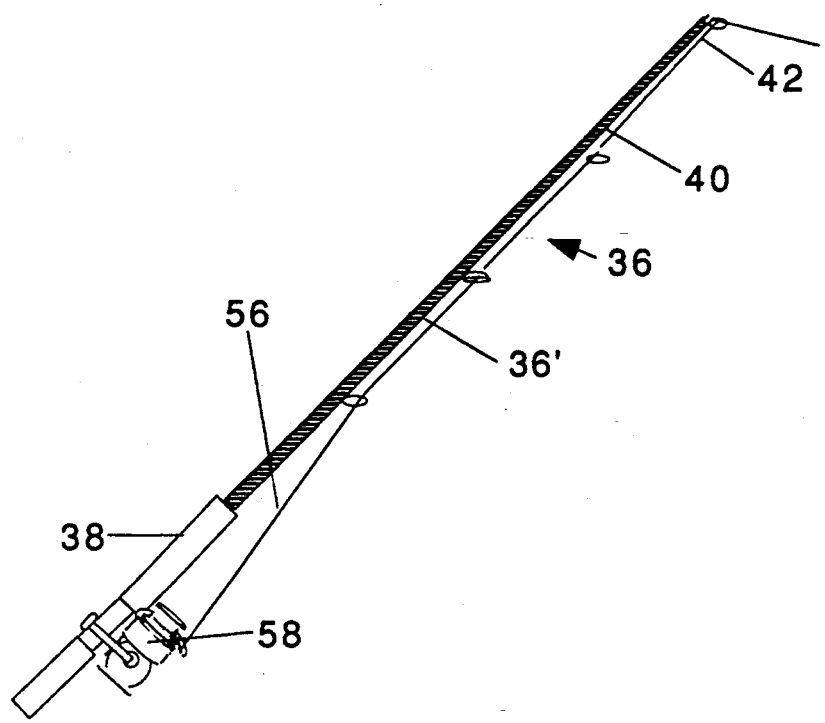
Figure (1c)
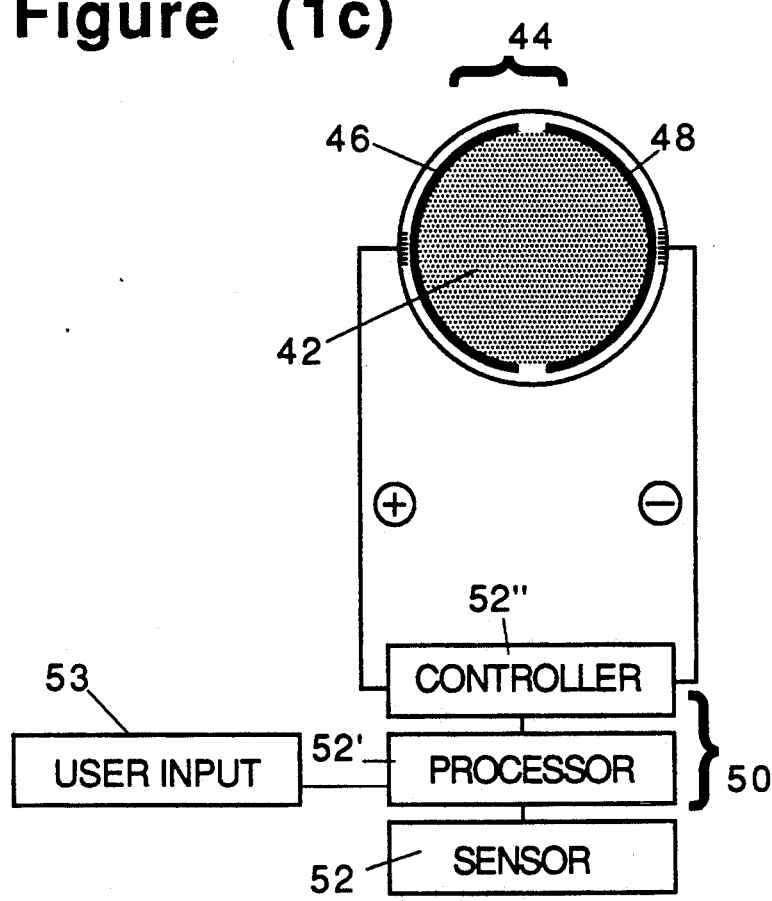
Figure (1d)

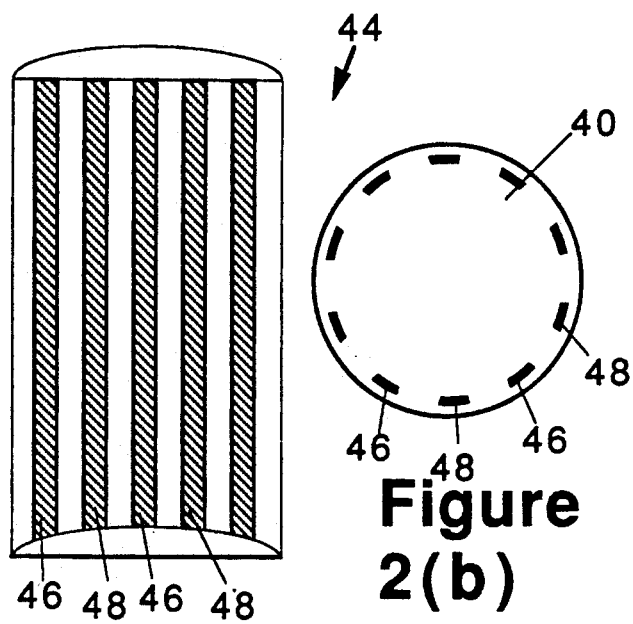
Figure 2(a)
Figure 2(b)
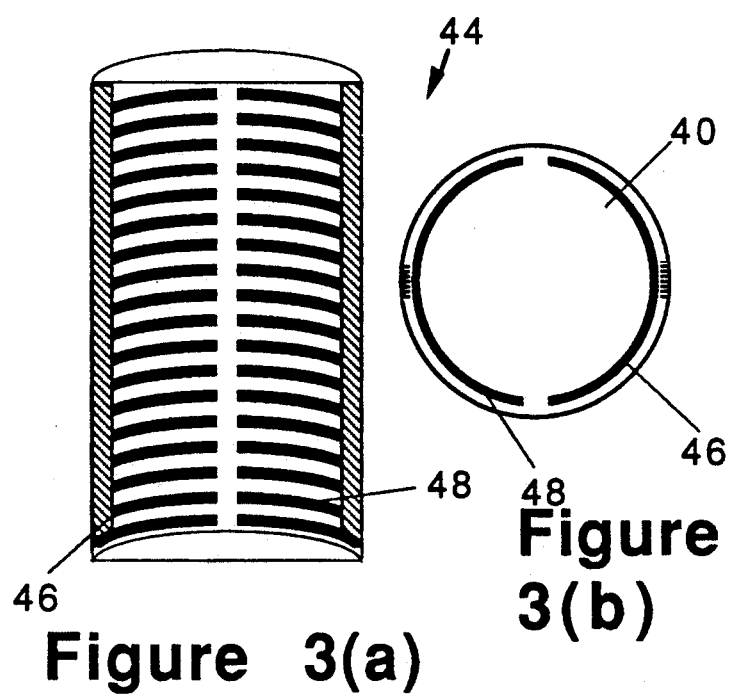
Figure 3(a)
Figure 3(b)

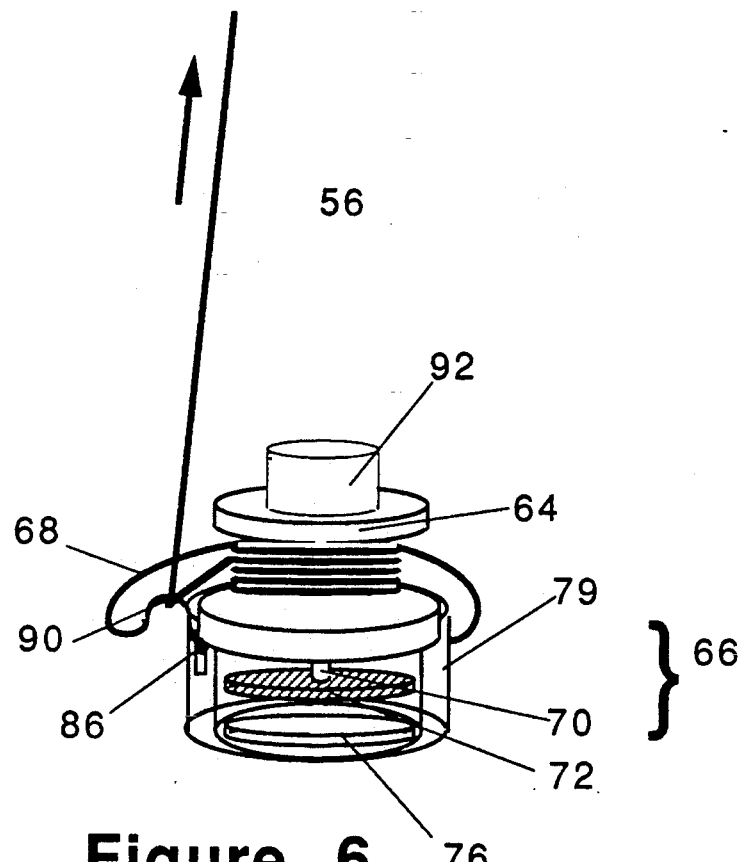
Figure 6
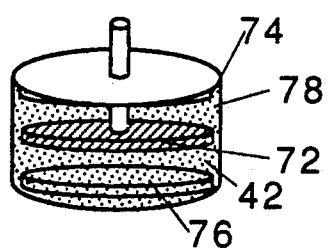 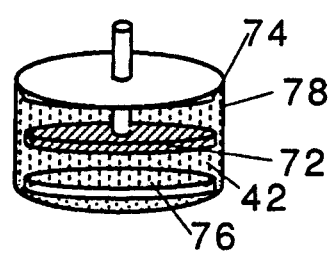
Figure 7(a)   Figure 7(b)

TENSION RESPONSIVE FISHING APPARATUS

This application is a division of application Ser. No. 772,930, filed Oct. 8, 1991, now U.S. Pat. No. 5,195,267.

BACKGROUND OF THE INVENTION

The present invention pertains to a tension responsive fishing apparatus. More particularly, the present invention pertains to a tension responsive fishing apparatus in which line tension on a fishing line caused by a fish is sensed in order to determine parameters for setting the fish hook, adjusting fishing pole stiffness, and adjusting the drag associated with the fishing reel.

Over the years, there have been improvements to the fishing poles used by anglers when catching fish. Generally, these improvements consisted of advancements in the materials used to make the fishing pole. For example, for many years it was common to use natural materials, such as wood or bamboo, to provide a fishing pole which had a suitable flexure. However, these natural materials were often inadequate due to the lack of control of the consistency of the material, susceptibility to splintering and/or susceptibility to degradation due to rot or insects. An example of a conventional fishing pole is shown in FIG. 8(a). A pole 12, is attached to a handle 14 and fishing line 16 is guided through eyelets 18. A conventional reel 20 is provided for holding the fishing line 16 and for retrieving the fishing line 16. In modern times, with the advancements of material science, fishing poles have been constructed using such advanced materials as, for example, fiberglass. This provided a means for repeatedly manufacturing fishing poles having consistent flexure and other quality control standards. Furthermore, the use of fiberglass also made the fishing pole much more durable and much less susceptible to degradation due to natural causes. However, even the fiberglass fishing pole was lacking in the combination of sensitivity, appropriate flexure, and strength.

Recently, new composite materials have been utilized in the production of fishing poles. For example, a graphite composite fishing pole is known which takes advantage of the light weight and high strength of the graphite composite which allow a controllable and consistent manufacturing process while advancing the obtaining of the desired goal of the combination of sensitivity, appropriate flexure, and strength. However, like the other conventional fishing poles, even the graphite composite fishing pole is severely inadequate in that the flexure associated with a particular pole is predetermined and unchangeable and is determined by, for example, the thickness of the composite material, the type of composite material, the length of the rod, etc.

Optimally, a fishing pole should be constructed which has a variable flexure. In other words, it is desired that a fishing pole be constructed in which a relatively large amount of elasticity and flexure is present during, for example, the casting of the lure or bait to provide improved distance and accuracy. Furthermore, when setting the hook in a fish which has struck the lure or bait, it is desired that the fishing pole have a degree of stiffness which is adequate to jerk the hook to force the barb of the hook into the flesh and/or bone of the fish's mouth.

Furthermore, during the fight of the fish it is desired that the flexibility of the fishing pole may be adjustable at different times during the duration of the fight. For example, after setting the hook while the fish still has a lot of fight in it, it is desirous that the fishing pole have an adequate degree of flexibility and elasticity to absorb the shocks associated with the relatively strong fight in the fish. Then, as the fish tires, it is desired to continually adjust the stiffness of the fishing pole to optimally retrieve the fish while still providing enough flexure to absorb the shocks of the weakening fight of the fish.

Conventional fishing poles are inadequate in that they provide absolutely no means for adjusting the stiffness of the fishing pole. Therefore, an angler is forced to select from an assortment of fishing poles having varying stiffness dependent on the circumstances and conditions he anticipates to encounter while fishing. Among other things, this substantially raises the costs associated with fishing in that a variety of poles must be on hand depending on the anticipated conditions. Alternatively, if an improper pole has been selected, a fish too large for the pole may hit, resulting in the disadvantageous effect of broken equipment or worse yet, lost fish.

Conventionally, fishing reels have been provided to facilitate the retrieving of the fishing line and to facilitate the bridging in of the fish. An example of a conventional reel is shown in FIG. 8(b). A case 22 is provided and is rotatable in response to the cracking of a crank 24 by a user. A bobbin 26 is provided and during retrieval of the fishing line 16 remains rotatably still relative to the rotation of the case 22. The case 22 carries a bale 30 and the fishing line 16 is slidably held by a bail hoop 28. Thus, as the crank 24 is turned, the fishing line 16 is wound around the bobbin member 26. The bobbin 26 is rotatable in response to tension applied to the fishing line 16 by, for example, a hooked fish. A drag mechanism 32 is provided for applying a constant drag against the rotation of the bobbin 26. The strength of the drag is set by a user to what he estimates is an appropriate drag strength. These conventional reels have been constructed with this drag mechanism 32 for applying a degree of drag to the fishing line 28 to provide resistance to the efforts of the fish. This drag is also provided so that during trolling, the water resistance experienced by a lure trolled behind a boat, due to the relative motions of the water and the boat, is compensated for and prevents the lure and excessive line from being pulled out while still providing a loose enough drag so that a striking fish does not snap the line and/or does not notice the unnatural movement of the lure before the hook can be set in the fish's mouth. This drag mechanism is further provided so that during the fight of the fish an appropriate amount of drag can be applied to resist the efforts of the fish allowing the angler the ability to reel the fish in without snapping the line. However, this drag must be continually adjusted during the fight of a fish, particularly when a large fish is taken on light tackle.

This is because during the duration of the fight of the fish the fish will have varying degrees of strength and will exhibit various escape maneuvers which must be compensated for in order to prevent the drag from causing the line to snap during a particularly violent action taken by the fish. In other words, the angler must be constantly aware of the actions of the fish and must constantly adjust the drag applied to the fishing line during the duration of the fight. Unfortunately, oftentimes a tired fish will have enough energy reserves for a few violent spasms, particularly when the fish sights the boat, which are often enough to snap the line against the tightened drag necessary to reel the fish in, causing the fish to be lost.

Furthermore, there are many instances when an angler loses a fish because he has either improperly set the hook or he was not holding the fishing pole to set the hook when the fish strikes. For example, when trolling, it is common to keep the drag of the conventional reel set so that a fish striking at the lure does not feel any resistance from the drag. In other words, the drag is set to just prevent the water resistance from pulling out more fishing line. Therefore, when the angler is driving the boat and unable to attend to the pole or poles, he listens for the sound of line being taken from the reel signifying that a fish has struck and he must quickly get to the pole, set the drag, and violently jerk back on the pole to set the hook in the fish's mouth. Unfortunately, by the time the fisherman gets to his pole the fish has already determined that the lure is not real and has spit the lure out resulting in another lost fish. Also, oftentimes a fisherman will fish with two or more poles to increase his chances of catching fish. In these instances, he may again employ the technique of setting a very low drag resistance and then listening for the quick out take of line from the reel signifying the striking of a fish. Again, this often results in a lost fish due to the time factor involved in getting to the pole. The conventional art provides no adequate means for alleviating these substantial drawbacks associated with fishing.

SUMMARY OF THE INVENTION

It is an object of the present invention to provide a means for overcoming the many drawbacks associated with conventional fishing apparatus. In particular, it is an object of the present invention to provide an improved fishing pole which has a variable amount of flexure. It is another object of the present invention to provide an improved reel in which the amount of drag may be subtilely or dramatically varied in a very short amount of time and which further may be varied automatically dependent on the tension provided by a fighting fish. It is still another object of the present invention to provide a means for automatically setting the hook of an unattended fishing pole when a fish strikes before the fish has a chance to spit the lure and/or bait out.

In accordance with the present invention a fishing pole is provided having a flexure which may be nearly infinitely variable between two extremes of highly elastic and highly rigid. Thus, it is an object of the present invention to provide a fishing pole in which the flexure associated with the fishing pole may be continuously adjusted depending on the circumstances and the conditions of use and which may be continuously adjusted in real time in response to dynamic feedback of the fight of a fish.

In accordance with the present invention an improved reel is provided which alleviates the disadvantages associated with conventional reels. In particular, it is an object of the present invention to provide an improved reel in which the line drag associated with the reel may be varied depending on the circumstances and the conditions of use and in which the line drag may be varied in response to dynamic feedback of a fish's fight. Furthermore, it is an object of the present invention to provide a means by which the line drag associated with a reel is varied in response to real time changes in circumstances and conditions dependent on predetermined values to thereby provide a means for optimally retrieving a fish while compensating for the test strength of the particular fishing line.

In accordance with the present invention, a means is provided for automatically setting a hook in response to a strike by a fish within an appropriate amount of time so that the fish either cannot spit the lure out or has time to take the lure fully into its mouth before the hook is automatically set. It is an object, therefore, of the present invention to provide a means by which the fishing line of the inventive fishing apparatus may be quickly jerked back in response to the striking of a lure and/or bait by a fish, to thereby automatically set the hook in the fish's mouth.

In accordance with the present invention, a tension responsive fishing apparatus is provided which includes a pole member having an interior. The interior of the pole member is filled with a variable viscosity fluid, such as, electrical rheological fluid, magnetic-powder dispersed fluid, or the like. Potential applying means are provided for applying a potential to the variable viscosity fluid which causes the variable viscosity fluid to vary in viscosity depending on the amount of potential applied thereacross. In other words, depending on the amount of potential applied to the variable viscosity fluid disposed in the interior of the pole member, the flexure of the pole member may be selectively varied from extremes of high flexibility to high rigidity.

In accordance with the inventive tension responsive fishing apparatus, a reel member is provided which includes a bobbin member for holding and releasing a length of fishing line. Varying resistance means are provided for varying a resistance applied to the bobbin member which is effective to control the release of the fishing line by controlling the rotation of the bobbin member. Controlling means are provided for controlling the varying resistance means in response to input signals inputted by an inputting means.

In accordance with the present invention, a tension responsive fishing apparatus is provided with hook setting means for setting a hook when a fish strikes. The hook setting means includes triggering means for sensing tension during a fish strike and triggering an operation of the hook setting means. Line conveying means are provided which are operable for conveying the fishing line in a direction effective to set the hook. Urging means are also provided which are operable for urging the conveying means in a direction effective to set the hook.

It is yet another object of the present invention to provide a tension responsive fishing apparatus in which an automatic hook setting means is provided for automatically setting a fishing hook in response to a fish strike, used in combination with a fishing pole which has a varying amount of flexure dependent on adjustments made by the angler and dependent on adjustments made automatically by a control means, and an improved fishing reel in which the drag associated with the reel may be subtilely or dramatically varied instantaneously depending on adjustments made by the angler and depending on adjustments made by control means in response to the fight of a fish.

BRIEF DESCRIPTION OF THE DRAWINGS

FIG. 1(a) is a view of the improved fishing pole of the inventive tension responsive fishing apparatus;

FIG. 1(b) is a cross-sectional view of the improved fishing pole shown in FIG. 1(a) and a schematic view of the controlling means;

FIG. 1(c) is a view of the improved fishing pole of the inventive tension responsive fishing apparatus;

FIG. 1(d) is a cross-sectional view of the improved fishing pole shown in FIG. 1(c) and a schematic view of the controlling means;

FIG. 2(a) is a longitudinal sectional view of an embodiment of the interior of the improved fishing pole;

FIG. 2(b) is a cross-sectional view of the embodiment of the interior of the improved fishing pole shown in FIG. 2(a);

FIG. 3(a) is a longitudinal sectional view of another embodiment of the interior of the improved fishing pole;

FIG. 3(b) is a cross-sectional view of the embodiment of the interior of the improved fishing pole shown in FIG. 3(a);

FIG. 6 is an exploded view of the embodiment of the drag setting means shown in FIG. 5 and driving means;

FIG. 7(a) is an isolated perspective view of the varying resistance means of the improved reel showing randomly dispersed particles;

FIG. 7(b) is an isolated perspective view of the varying resistance mean of the improved reel showing aligned particles;

DETAILED DESCRIPTION OF THE DRAWINGS

Figure 4A:
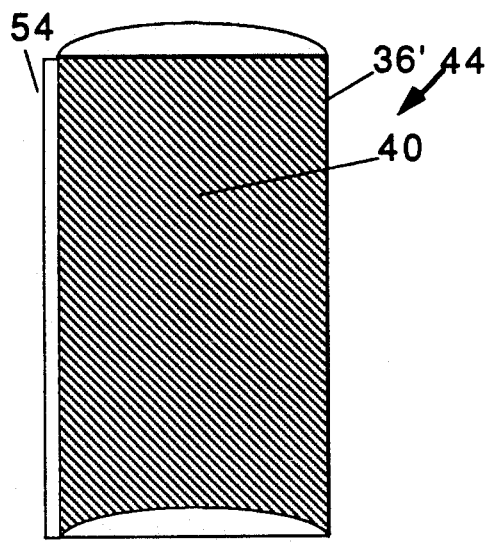
FIG. 4(a) is a longitudinal sectional view of yet another embodiment of the interior of the improved fishing pole and an alternative embodiment of the tension sensing means.

Referring to FIGS. 1(a) through 1(d), an embodiment of the inventive improved fishing pole 36 is shown. In this embodiment, the improved fishing pole 36 includes a handle 38 which has means disposed on it for attaching a reel 58. A pole member 36' is attached to the handle 38 and is tapered so that the end of the pole member 36' attached to the handle 38 is wider than the other end of the pole member 36'. The pole member 36' has an interior portion 40 which has a variable viscosity fluid 42 disposed therein. The variable viscosity fluid 42 may be, for example, electrical rheological fluid or a magnetically reactive material, such as stainless steel powder or the like. In this case, the variable viscosity fluid 42 undergoes viscosity characteristic changes in response to an applied electric field in the case of an electrical rheological fluid or an applied magnetic field in the case of a magnetically reactive material. In other words, depending on the value of the potential applied to the variable viscosity fluid 42, the viscosity of the fluid 42 varies to thereby cause a change in the flexure characteristics of the pole member 36'. The potential or field is applied through potential or field applying means 44 (FIGS. 1(b) and 1(d) which applies a variable potential or field to the variable viscosity fluid 42 through, for example, a positive electrode 46 and a negative electrode 48. In the preferred embodiment, the potential or field applying means 44 comprises the positive electrode 46 and the negative electrode 48, which applies an electric field to an electrical rheological fluid, which is the preferred variable viscosity fluid. Alternatively, the potential or field applying means 44 comprises an electromagnetic field applying means, in which case the electrodes 46 and 48 may be replaced by a source of magnetic field lines, such as a conductive winding having a variably applied electric current flowing through it. In this case, the variable viscosity fluid 42 is a magnetically reactive material, such as stainless steel powder or the like. Controlling means 50 are provided for controlling the potential applied through the potential or field applying means 44. The controlling means 50 includes an inputting means, such as sensor 52 or user-input 52 for inputting input signals, processing means 53' receptive of the input signals for processing control signals in response thereto and a control circuit 52" receptive of the control signals for controlling the potential applied to the variable viscosity fluid 42. The controlling means 50 may be disposed within the handle 38 to conveniently place the controlling means 50 at a suitable location. The controlling means 50 includes at least sensing means 52 for sensing a tension being applied to the fishing line 56 or a flexure of the pole member (described below with reference to FIG. 4(a)), and outputting the input signals in response thereto. The sensing means 52 may be disposed, for example, in association with either the fishing line 56, the reel 58, or the fishing pole 36. The controlling means 50 may also include user-operable inputting means 53 receptive of user determined input and for outputting the input signals, such as a user selectable and adjustable threshold value in response thereto. In this case, the user may selectively determine the strength of the potential applied to the variable viscosity fluid 42 to thereby fine tune the flexure of his fishing pole 36 depending on the circumstances and the conditions of use. Alternately, the inventive fishing pole 36 may have a non-selectable threshold value, in which case the flexure of the pole can not be manually adjusted by the user.

FIG. 1(b) shows the variable viscosity fluid 42 having randomly dispersed particles. In this case, the variable viscosity fluid 42 is relatively free flowing and presents relatively little resistance to the flexure of the improved fishing pole 36.

FIG. 1(d) shows the variable viscosity fluid 42 having aligned particles. An example of a variable viscosity fluid 42 is disclosed, for example, in U.S. Pat. No. 2,417,850, issued to Winslow. As shown in FIG. 1(d) the variable viscosity fluid 42 applies a relatively great amount of resistance to the flexure of the improved fishing pole 36 causing the improved fishing pole 36 to increase in stiffness. By appropriately controlling the potential applied to the variable viscosity fluid 42, the improved fishing pole 36 may be selectively altered between the extremes of greatest flexibility to greatest rigidity. This selectivity is due to the progressive gelling, in the case of an electrical rheological fluid, in response to an applied electric potential field strength. The electrical rheological fluid effect is due to an interaction between charges placed on the electrodes and those in the particles dispersed in the fluid. Response, which takes milliseconds, is in the form of a progressive gelling that is proportional to field strength. In the case of magnetically reactive material, the selectivity is due to a varying of the viscosity and/or stiffness of the magnetically reactive material. For example, stainless steel powder behaves as a free flowing material when an applied magnetic field is absent. However, when a magnetic field is applied, the particles of the stainless steel powder align along the applied magnetic field lines and thereby the viscosity of the free flowing stainless steel powder is increased. Also, the stiffness of the bulk of stainless steel powder is increased due to the individual particles' alignment.

Referring to FIGS. 2(a) through 4(c), examples of alternative configurations of the potential applying means 44 are shown. It is noted that these are only examples, as the exact configuration of the construction of the potential applying means 44 may be widely varied. FIGS. 2(a) and 2(b) show a particular pattern of the electrodes 46, 48 of the potential applying means 44. FIG. 2(a) is a longitudinal sectional view of a portion of the interior 40 of the pole member 36' and shows the electrodes 46, 48 disposed longitudinally and radially spaced in a striped pattern.

FIG. 3(a) is a longitudinal sectional view of a portion of the interior 40 of the pole member 36' and FIG. 3(b) is a cross-sectional view of the pole member 36'. In FIGS. 3(a) and 3(b), the electrodes 46, 48 of the potential applying means 44 are shown configured in an axially spaced ring pattern.

Figure 4B:
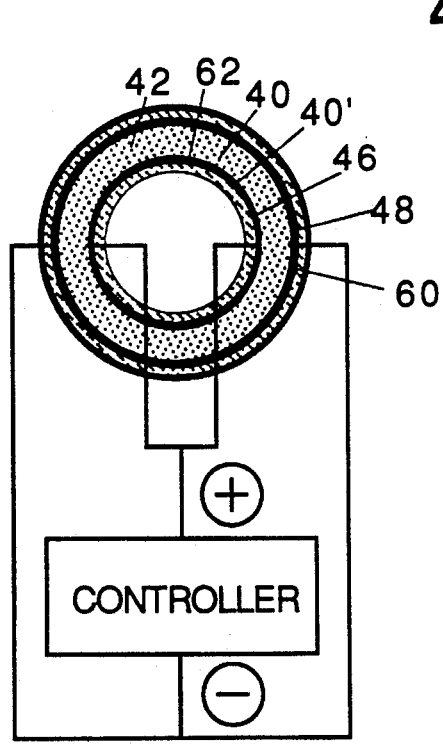
FIG. 4(b) is a cross-sectional view of the embodiment of the interior shown in FIG. 4(a) showing randomly dispersed particles.
Figure 4C:
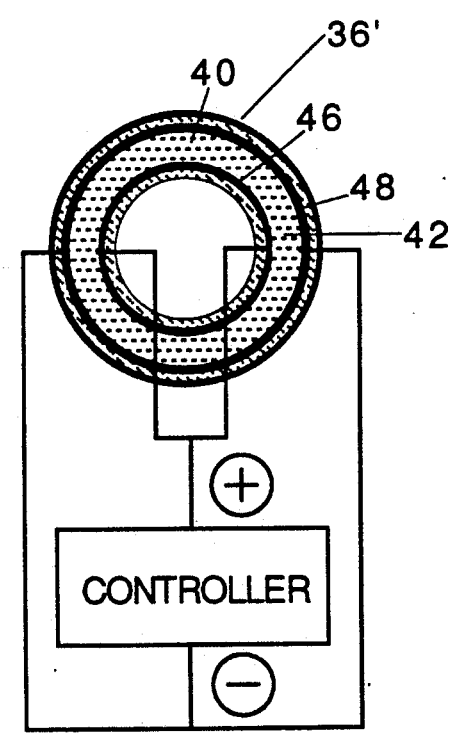
FIG. 4(c) is a cross-sectional view of the embodiment of the interior shown in FIG. 4(a) showing aligned particles.

FIGS. 4(a) through 4(c) show a particular preferred embodiment of the potential applying means 44 and a preferred embodiment of the tension sensing means 54. The tension sensing means 54 may be constructed to sense the line tension as a quantity dependent on the flexure of the pole member 36'. For example, the tension sensing means 54 may be comprised of one or more strain gauges disposed along the length of the pole member 36'. FIG. 4(a) is a longitudinal sectional view of a portion of the interior 40 of the pole member 36' and as shown more clearly in FIGS. 4(b) and 4(c) the interior 40 is comprised of a hollow core 40' surrounded by an inner radial wall 62 which supports, in this case, a positive electrode 46 of the potential applying means 44. It is noted that the inner radial wall 62 may be comprised solely of the positive electrode 46. The positive electrode 46 is surrounded by the variable viscosity fluid 42 which may be comprised, for example, of an electrical rheological fluid or a magnetic-powder dispersed fluid. Surrounding the variable viscosity fluid 42 is the other electrode, in this case the negative electrode 48. The negative electrode is supported by an outer radial wall 60. It is contemplated that the outer radial wall 60 and/or the inner radial wall 62 may be comprised of a composite material, such as a graphite composite, fiber glass, wood, or the like. Furthermore, either the outer wall 60 or the inner wall 62 may be comprised of a conductor such as a metal, metal composite or metal alloy in which case the wall will act as the electrode. As shown in FIG. 4(b), when there is no potential applied to the variable viscosity fluid 42 the particles are randomly dispersed throughout the fluid 42. In this state, the variable viscosity fluid 42 is more or less free flowing. In this case, the variable viscosity fluid 42 applies the least amount of resistance to the flexing of the pole 36 member.

FIG. 4(c) shows the particles in the variable viscosity fluid 42 being aligned due to a potential applied to the fluid 42 through the electrodes 46, 48 controlled by the controller circuit. As the electric field acting on the fluid 42 is increased, progressive gelling occurs dependent on the field strength. In this case, when the particles are brought to maximum alignment the maximum amount of resistance to the flexibility of the pole member 36' is applied and the maximum stiffness of the improved fishing pole 36 is obtained. By selectively controlling the potential applied to the variable viscosity fluid 42 therefore, it is possible to alter the flexibility of the pole member 36' either subtilely or dramatically, between the extremes of greatest flexibility and greatest stiffness.

Figure 5:
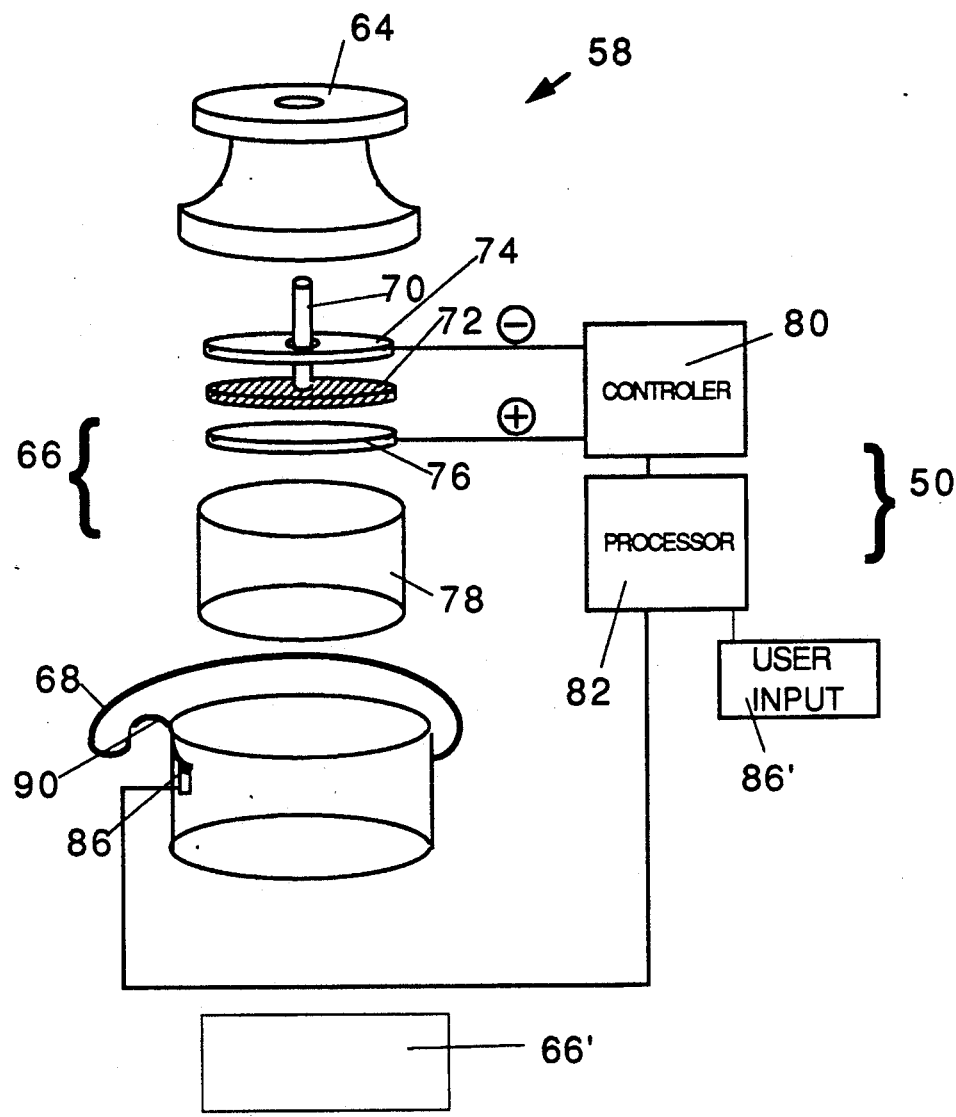
FIG. 5 is a perspective view of an embodiment of the drag setting means of the improved reel.
Figure 8A:
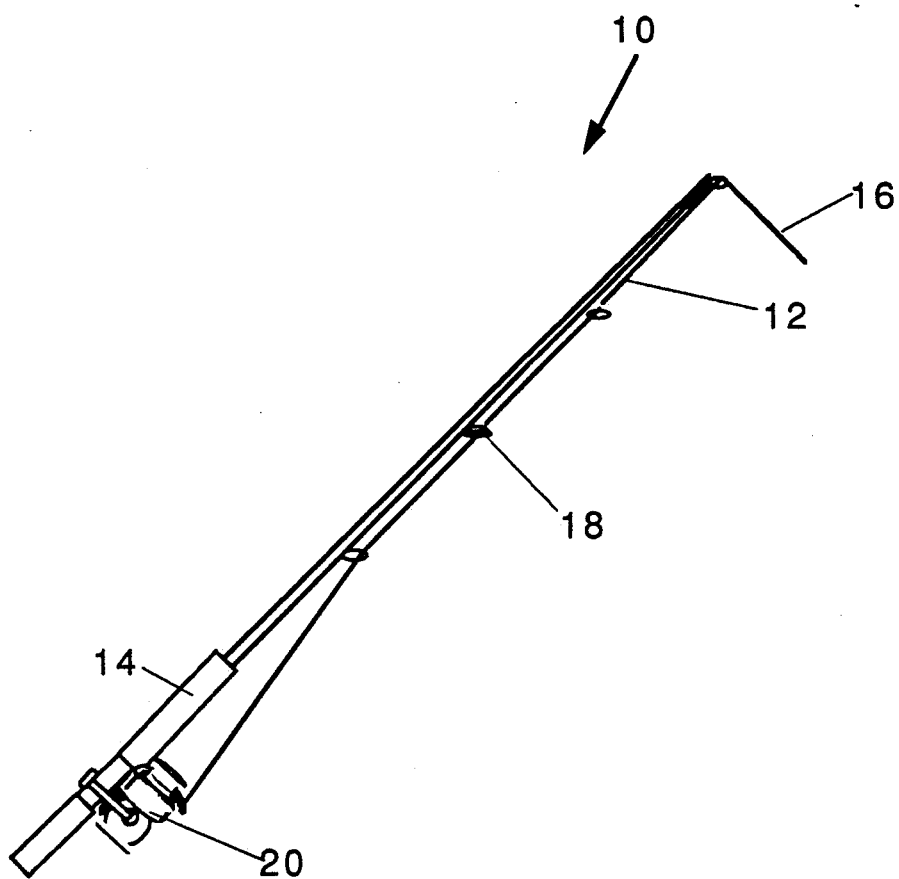
FIG. 8(a) is a view of a prior art fishing pole and a prior art reel combination.
Figure 8B:
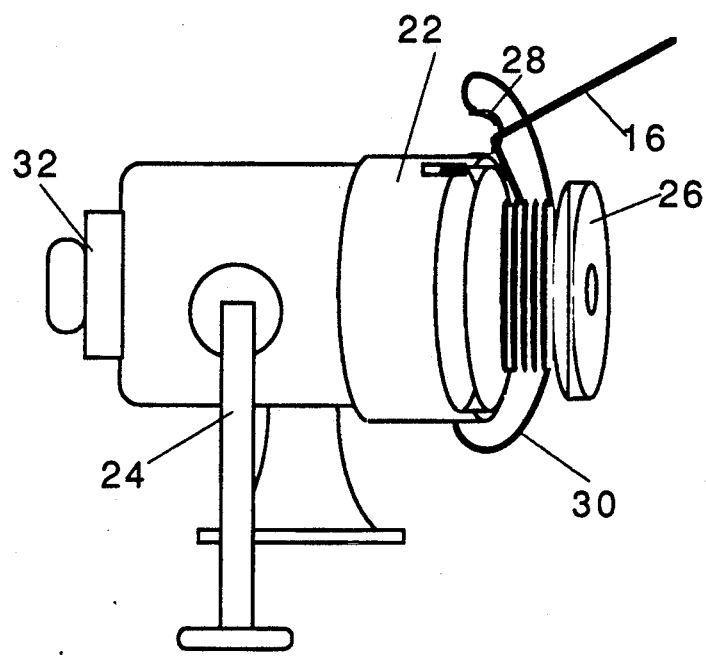
FIG. 8(b) is a view of a prior art reel.

Referring to FIG. 5, a schematic view of an embodiment of the improved reel 58 is shown. In this embodiment a bobbin member 64 is provided for holding and releasing a length of fishing line 56 (shown in FIG. 6). Resistance to the rotation of the bobbin member 64 is provided through, for example, a conventional drag applying mechanism 66' which may be augmented by the inventive varying resistance means 66. Furthermore, it is contemplated that the conventional drag applying mechanism 66' may not be required in which case the drag applied through the bobbin member 64 is supplied solely by the varying resistance means 66. A bale 68 is provided which may be, as with conventional reels, flipped up when casting out the line. When the bale 68 is disposed in the retrieving position, the bale 68 is rotatably driven in one direction only and is adapted to wrap the line around the bobbin member 64 when it is rotated in that one direction. In this embodiment, the bale 68 terminates at one section in a tension sensor 86 which is adapted to sense the tension applied to the line as transmitted through the bale 68. The varying resistance means 66 is provided for varying the resistance applied to the bobbin member 64 dependent 64 which is effective to control the release of the fishing line 56.

Controlling means 50 are provided for controlling the varying resistance means 66 in response to input signals. Inputting means are provided for inputting the input signals, and the inputting means includes at least one of the tension sensing means 86 for sensing a tension being applied to the fishing line 56 and outputting the input signals in response thereto, and user-operable inputting means 86' receptive of user-determined input for outputting the input signals in response thereto. Thus, in accordance with this embodiment of the improved reel 58, when a fish is hooked on the fishing line 56 and is being reeled in, the tension sensing means 86 senses variations in the tension applied to the line by the fish and adjusts the drag on the line through the varying resistance means 66 to thereby provide the optimum resistance so that the fish can be efficiently reeled in while limiting the possibility that the sudden movements of the fish will snap the line. Thus, in accordance with the present invention, an angler may be able to take a larger fish on a lighter test line with a reduced possibility of losing the fish due to sudden violent actions taken by the fish.

Referring to FIG. 6, in conjunction with FIG. 5, the construction of an embodiment of the improved reel 58 will be described. The bobbin member 64 is rotatable by the action of the fishing line 56 being dragged out, for example, in response to the actions of a hooked fish. The bobbin member 64 rotates the axle 70 which is integrally attached to a friction plate 72. The friction plate 72 is disposed between a first electrode 74 and a second electrode 76. Alternatively, the friction plate 72 can also be the second electrode. The varying resistance means includes the axle 70, the friction plate 72, the first and second electrodes 74, 76 and containing means 78. The containing means 78 contains a variable viscosity fluid 42 (shown in FIGS. 7(a) and 7(b)), such as an electrical rheological fluid or a magnetically reactive dispersed fluid such as stainless steel powder, or the like, which surround the friction plate 72 and is disposed at least between the two electrodes 74, 76. In the case of stainless steel powder, or the like, the first and second electrodes 74 and 76 are replaced with magnetic field applying means (not shown). The electrodes 74, 76 are applied with a potential by the controller 80 (shown in FIG. 5) to thereby apply a potential to the varying viscosity fluid 42 so that the friction experienced by the friction plate 72 can be appropriately set to counteract the rotational urging of the bobbin member 64 by the fishing line 56 and apply an appropriate degree of drag to the line in response to the actions of the fish, or when trolling, the force exerted by water resistance. Controlling means 50 are provided including the controller 80, a processor 82, user-input means 86', and the tension sensor 86.

A case member 79 is provided which has the bale 68 attached to it. The bale 68 has a bale hoop 90 around which the fishing line 56 is slidably passed and when the case member 79 is rotated around the bobbin member 64 it causes the bale hoop 90 to also rotate around the bobbin member 64 to thereby retrieve the fishing line 56 and wind it around the bobbin member 64. Tension is sensed, for example, by sensing the urging of the bale hoop 90 against the action of a spring member or against the action of a pressure sensor comprising the tension sensor 86. The tension sensor 86 thus provides input signals to the controlling means 50 so that the drag applied through the varying resistance means 66 to the bobbin member 64 may be appropriately controlled to facilitate the catching of a fish and to prevent the disadvantageous snapping of the fishing line 56. Also, the user-input means 86' may input the input signals to the controlling means 50 to provide a user-determined degree of drag applied through the varying resisting means 66. Furthermore, driving means including a motor 92 controlled by signals from the processor 82, may be provided for driving the bobbin member 64 or for driving the case member 79 to retrieve the line, which may be particularly useful for a handicapped fisherman or to help an angler retrieve a particularly strong or large fish.

Furthermore, conventional drag setting means may be incorporated in the improved fishing reel 58 to provide an initial drag which is then augmented by the varying resistance means 66. Furthermore, the variable resistance may be applied by other mechanical means other than the disclosed varying resistance means 66 in which the drag applied by the other mechanical means varies dependant on the sense tension to accomplish the desired results of varying the drag applied to a line depending on, for example, the actions of the hooked fish.

Referring to FIGS. 7(a) and 7(b) an isolated view of the varying resistance means is shown. Containing means 78 are provided and contains the electrodes 74, 76, the friction plate 72 and a variable viscosity fluid 42 which surrounds at least the friction plate 72. As shown in FIG. 7(a), when little or no potential is applied to the variable viscosity fluid 42 the particles in the variable viscosity fluid 42 are randomly disposed. Therefore, the resistance to the rotation of the friction plate 72 is at its minimum. As shown in FIG. 7(b), when a potential is applied through the electrodes 74, 76 to the variable viscosity fluid 42, the particles in the variable viscosity fluid 42 become aligned to thereby create a resistance to the rotation of the friction plate 72 which must overcome the aligned particles by a force equal to at least a shear force of the aligned particles to thereby overcome the resistance provided by the variable viscosity fluid 42.

Figure 9A:
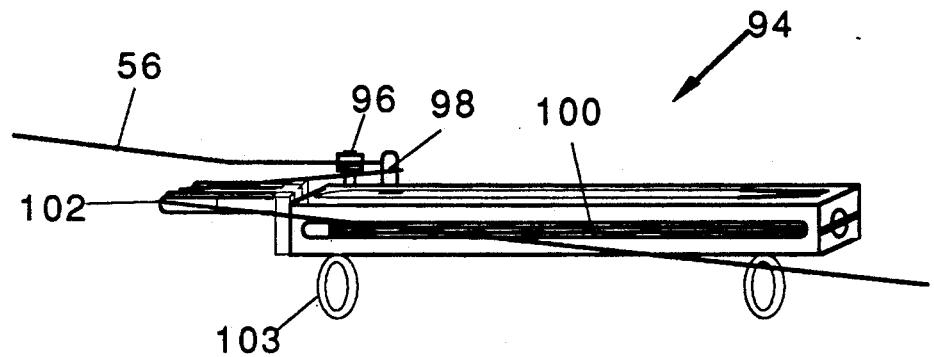
FIG. 9(a) is a perspective view of an embodiment of the inventive hook setting means.
Figure 9B:
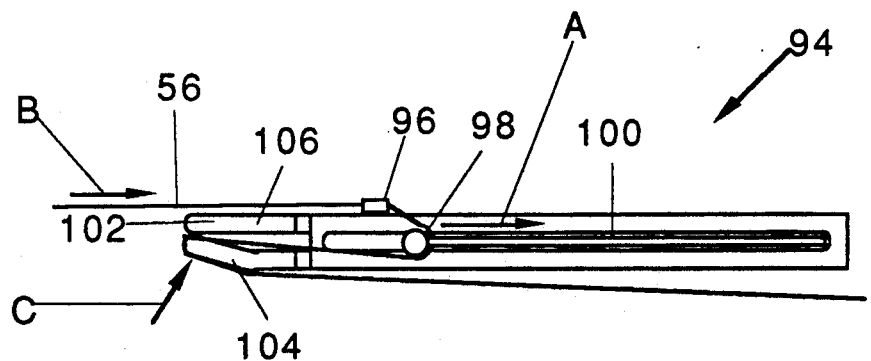
FIG. 9(b) is a top view of the embodiment of the inventive hook setting means shown in FIG. 9(a)

Referring to FIGS. 9(a) and 9(b), an embodiment of the inventive hook setting means 94 of the inventive tension responsive fishing apparatus is shown. The hook setting means 94 is provided for setting, in a hook setting operation, a hook attached to a fishing line 56 when a fish strikes the hook. The inventive hook setting means 94 is disposed along the length of the fishing line 56 at a portion of the line between a fishing reel and the hook. A portion of the line closer to the hook is engaged with a triggering means 96 for sensing tension, during a fish strike, and triggering an operation of the hook setting means 94. Conveying means 98 are provided which are operable for conveying the fishing line 56 in a direction effective to set the hook. Urging means 100, such as a spring member are provided and are operable for urging the conveying means 98 in the direction effective to set the hook. Furthermore, the inventive hook setting means 94 may also include line retaining means 102 disposed at a portion of the line closer to the fishing reel for retaining a portion of the unreeled fishing line 56 from motion during the hook setting operation relative to another portion of the unreeled line closest to the hook. Furthermore, the inventive hook setting means 94 may also include attaching means 103 for attaching the hook setting means 94 to a fishing pole.

In operation, the angler will engage the unreeled fishing line 56 with the triggering means 96 and with the line retaining means 102 and loop a portion of the fishing line 56 between the triggering means 96 and the line retaining means 102 around the line conveying means 98. The triggering means 96 is adapted to selectively release the energy stored in the urging means 100 in response to sensing the jerking action of a striking fish. The urging means 100 thus released will cause the line conveying means 98 to pull back thereby pulling back on the fishing line 56 attached to the hook while the line retaining means 102 retains the line from being pulled back relative to the fishing reel, thus jerking the hook into the fish's mouth causing the hook to be set in the fish.

Figure 10A:
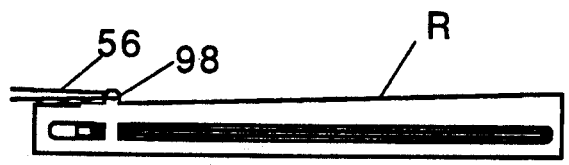
FIG. 10(a) is an isolated side view of a line releasing means of an other embodiment of the inventive hook setting means at an initial holding position.
Figure 10B:
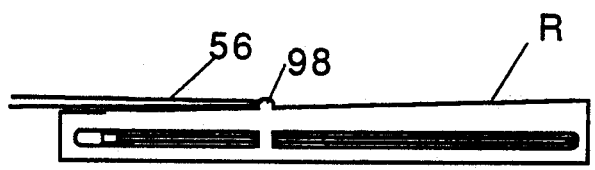
FIG. 10(b) is an isolated side view of a line releasing means of the embodiment of the inventive hook setting means shown in FIG. 10(a) at a line conveying position.
Figure 10C:
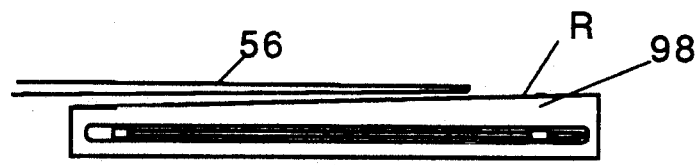
FIG. 10(c) is an isolated side view of a line releasing means of the embodiment of the inventive hook setting means shown in FIG. 10(a) at a line releasing position.

Referring to FIGS. 10(a) through 10(c) an isolated side view of a line releasing means of an other embodiment of the inventive hook setting means 94 is shown. FIG. 10(a) shows the line releasing means at an initial holding position. FIG. 10(b) shows the line releasing means at a line conveying position. FIG. 10(c) shows the line releasing means at a line releasing position.

Referring to FIGS. 9(a) to 10(c) the use of the inventive hook setting means 94 will be described. When a fish strikes a hook at the end of the fishing line 56, the triggering means 96 triggers the start of the hook setting operation. The line conveying means 98 is restrained from motion by the triggering means 96 until the fish strikes (FIG. 10(a)). Once the hook setting motion begins, the urging means 100, such as elastic tubing, spring, or the like, urges the conveying means 98 in a direction effective to set the hook in the fish's mouth. In this case, the line conveying means 98 is urged in the direction of arrow A (FIG. 9(b)). The portion of the fishing line 56 closest to the fish is violently jerked back in the direction of arrow B (FIG. 9(b)) by the pulling action of the line conveying means 98 and disengages from the triggering means 96. The portion of the fishing line 56 which is wrapped around the line retaining means 102 is restrained from relative motion by the line retaining means 102 due to the urging of a first finger member 104 of the line retaining means 102 towards a second finger member 106 in the direction of arrow C (FIG. 9(b)). The fingers 104, 106 are made of a suitable material, such as a soft rubber or plastic so that adequate friction develops to retain the line between the two fingers 104, 106 during the conveying of the fishing line 56 (FIG. 10(b)). Thus, the fishing line 56 closest to the reel is restrained from motion while the fishing line 56 closest to the hooked fish is violently jerked back, thereby setting the hook. As the conveying means 98 travels relative to a ramp portion R of the hook setting means 94, the conveying means 98 is exposed less and less and the fishing line 56 travels up the conveying means until the fishing line 56 is released (FIG. 10(c)). Thus, once the hook has been set in the fish's mouth, the line is released from the hook setting means 94 so that the angler is able to begin retrieving the fishing line 56 and thereby catch the securely hooked fish.

Figure 11A:
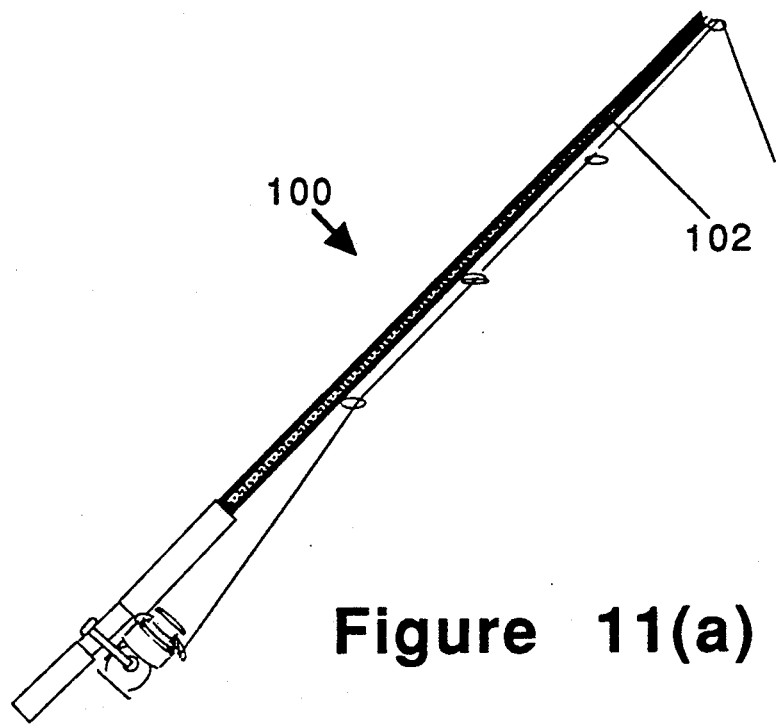
FIG. 11(a) is an alternative embodiment of the inventive fishing pool.
Figure 11B:
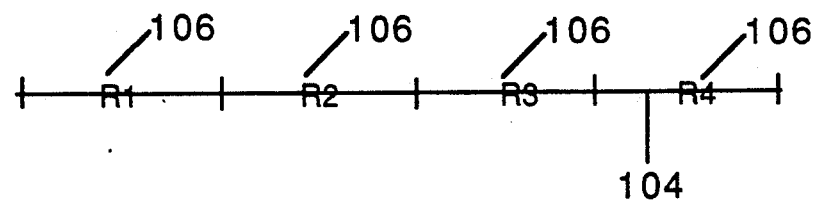
FIG. 11(b) is a schematic view of an alternative embodiment of an electrode of the inventive fishing pole.
Figure 11C:
FIG. 11(c) is a schematic view of an other alternative embodiment of an electrode of the inventive fishing pole.

Referring to FIG. 11(a), an alternative embodiment of the inventive fishing pole 100 is shown. The fishing pole 100 may be constructed with a liner 102 so that the variable viscosity fluid is encased in a rupture resistant medium and the outer wall of the pole does not have to have relatively as much structural integrity and thus is less expensive to manufacture. FIG. 11(b) shows an embodiment of an alternative electrode of the inventive fishing pole. This electrode includes resistors R1-R4 106 which may be disposed in series or in parallel along a central electrode 104. The resistors preferably have the relationship $R1 < R2 < R3 < R4$ (however, the value of the individual resistors may be different depending on the application). Thus, the flexibility of the fishing pole varies locally and can have an enhanced ability to alter in flexibility during use. FIG. 11(c) is another alternative embodiment of an electrode of the inventive fishing pole. Electrode posts 108 may be staggered on the central electrode 104 so that the tip has relatively less stiffness increase due to a given potential as compared with the handle. This allows manufacturing of cylindrical graphite tubes having flexibility varied using the variable viscosity fluid. Conventionally, fishing poles are manufactured with a long tapered cone shape. The use of a cylindrical graphite tube substantially reduces manufacturing costs because it is easier to control the manufacturing tolerances of a hollow cylinder than it is a hollow tapered cone.

Figure 12A:
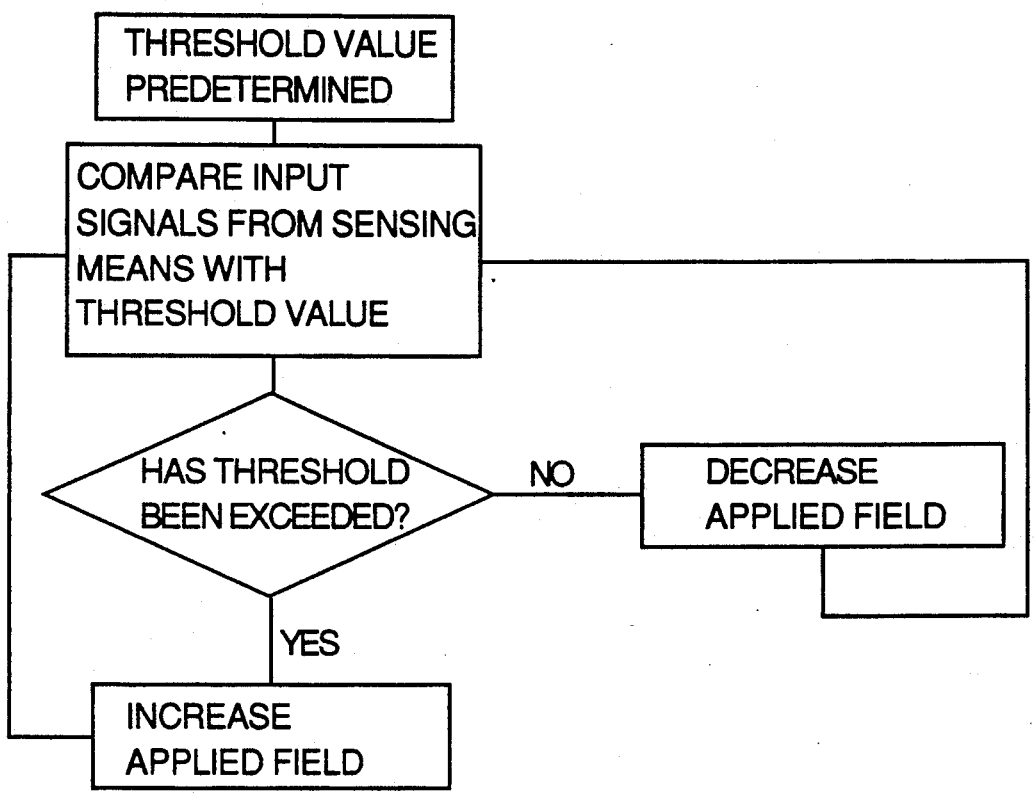
FIG. 12(a) is a flow chart showing the operation of the inventive fishing pole.

Referring to FIG. 12(a), in accordance with one mode of operation of the inventive fishing pole, a threshold value which is to be compared by the processing means 52' is predetermined (for example, it may be factory preset to give the inventive fishing pole 36 certain determined characteristics). The sensing means 52 senses a flexure of the pole member and produces input signals in response thereto. These input signals are compared by the processing means 52'. If the threshold has been exceeded (in other words, if the pole has flexed beyond a certain value) than the control circuit, which includes means for controlling the field applied to the variable viscosity fluid dependent on the sensed flexure, increases the applied field, thereby stiffening the pole and reducing the pole flexibility. If, on the other hand, the threshold has not been exceeded, then the applied field is decreased and the pole is made more flexible. Thus, the processing means may automatically determine the flexibility of the pole member depending on the sensed flexure of the fishing pole.

Figure 12B:
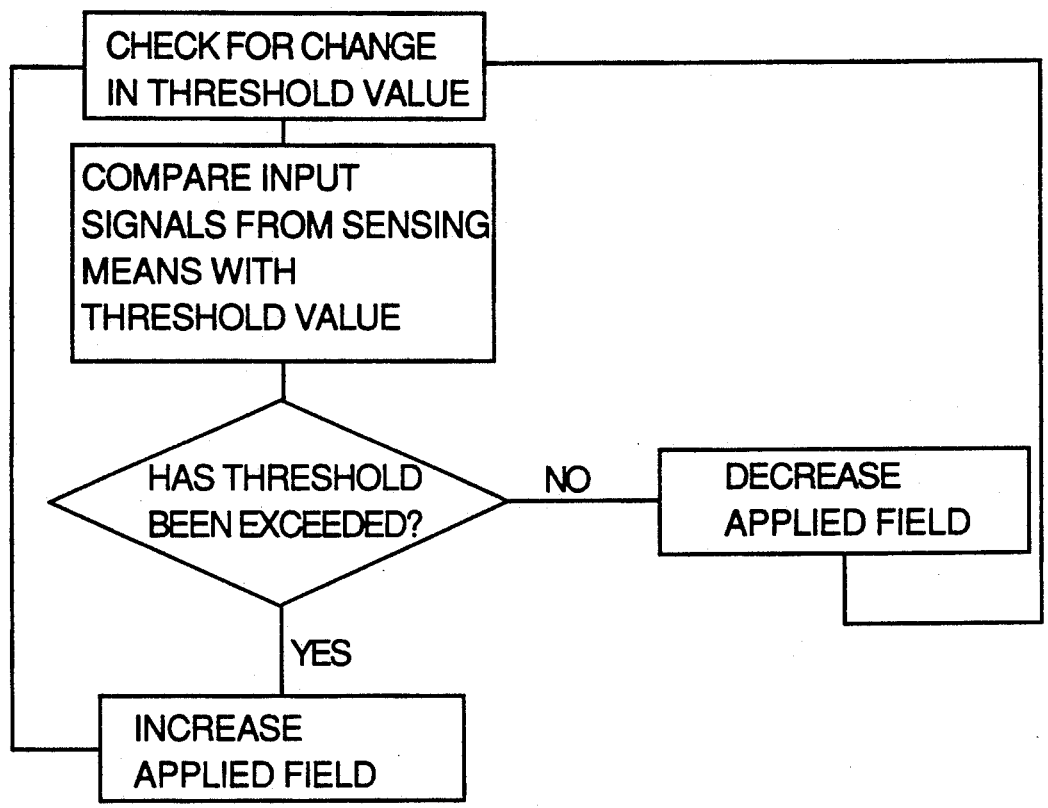
FIG. 12(b) is another flow chart showing another operation of the inventive fishing pole.

Alternatively, as shown in FIG. 12(b) user operable inputting means 53 may be provided which is receptive of user determined input and produces the input signals in response thereto. In this case, the threshold value changes depending on the user's preference. For example, the user may wish to keep the pole stiffer than a preset limit, even though a factory set threshold level has not been exceed, in anticipation of a fish tiring. Or, the user may wish to keep the pole particularly flexible, such as during casting, or when anticipating sudden movements by the fighting fish. Thus, as in the flow chart of FIG. 12(b), if the threshold has been exceeded (in other words, if the pole has flexed beyond a certain value) than the control circuit, which includes means for controlling the field applied to the variable viscosity fluid dependent on the sensed flexure, increases the applied field, thereby stiffening the pole and reducing the pole flexibility. If, on the other hand, the threshold has not been exceeded, than the applied field is decreased and the pole is made more flexible. However, before comparing the signals from the sensing means, the processing means first checks to determine if the user has changed the threshold value. If the threshold value has changed, then the new threshold value is used for comparison. The control circuit includes means for controlling the field applied to the variable viscosity fluid dependent on the user determined input, therefor, the user may selectably determine the flexibility of the pole member. In another alternative (the simple operation of which is not represented by a flow chart), the processing means does not compare the input signals with the threshold value. Instead, the control means just applies the field at a value which is selected by the user. In this case, the sensing means can be by-passed or eliminated.

With respect to the above description, it is realized that the optimum dimensional relationships for parts of the invention, including variations in size, materials, shape, form, function, and manner of operation, assembly and use, are deemed readily apparent and obvious to one skilled in the art. All equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention.

I claim:

1. A tension responsive fishing apparatus, comprising: a bobbin member for holding and releasing a length of fishing line; varying resistance means for varying a resistance applied to the bobbin member which is effective to control the release of the fishing line, the varying resistance means including a variable viscosity fluid comprised of at least one of either an electrical rheological fluid and a magnetic-powder dispersed fluid, and field applying means for applying a field to the variable viscosity fluid; controlling means for controlling the varying resistance means in response to input signals; and inputting means for inputting the input signals.

2. A tension responsive fishing apparatus according to claim 1, wherein the inputting means includes at least one of sensing means for sensing a tension being applied to the fishing line and outputting the input signals in response thereto, and user operable inputting means receptive of user determined input for outputting the input signals in response thereto.

* * * * *